C. F. MERRILL AND E. E. HALL.
FLY TRAP FOR CATTLE.
APPLICATION FILED MAY 6, 1918.

1,312,130.

Patented Aug. 5, 1919.
3 SHEETS—SHEET 1.

WITNESSES

INVENTORS
C. F. Merrill,
E. E. Hall,
BY
ATTORNEY

C. F. MERRILL AND E. E. HALL.
FLY TRAP FOR CATTLE.
APPLICATION FILED MAY 6, 1918.
1,312,130.
Patented Aug. 5, 1919.
3 SHEETS—SHEET 2.
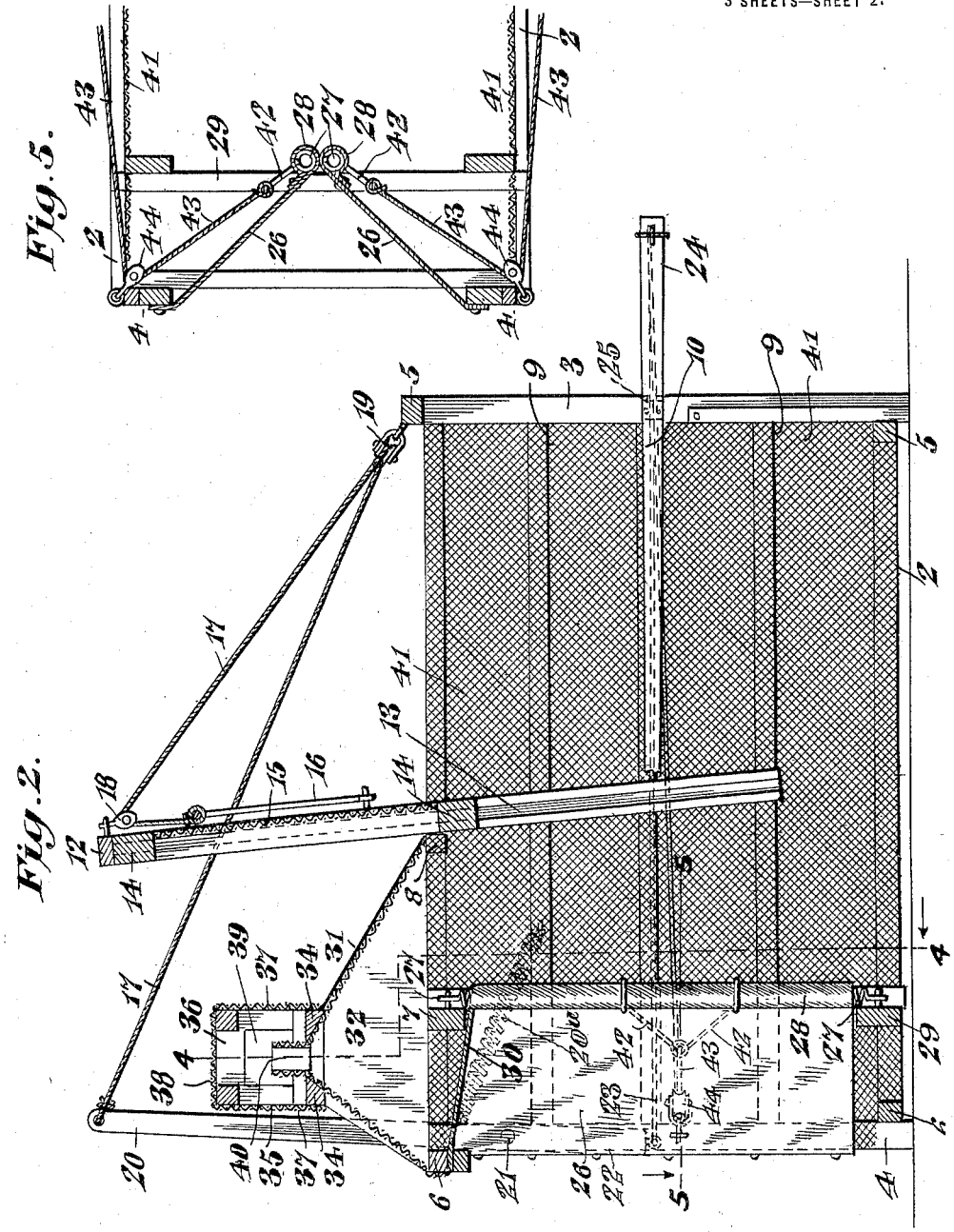
WITNESSES
Jas. E. McCathran
F. T. Chapman
INVENTORS
C. F. Merrill,
E. E. Hall,
BY
E. G. Siggers
ATTORNEY

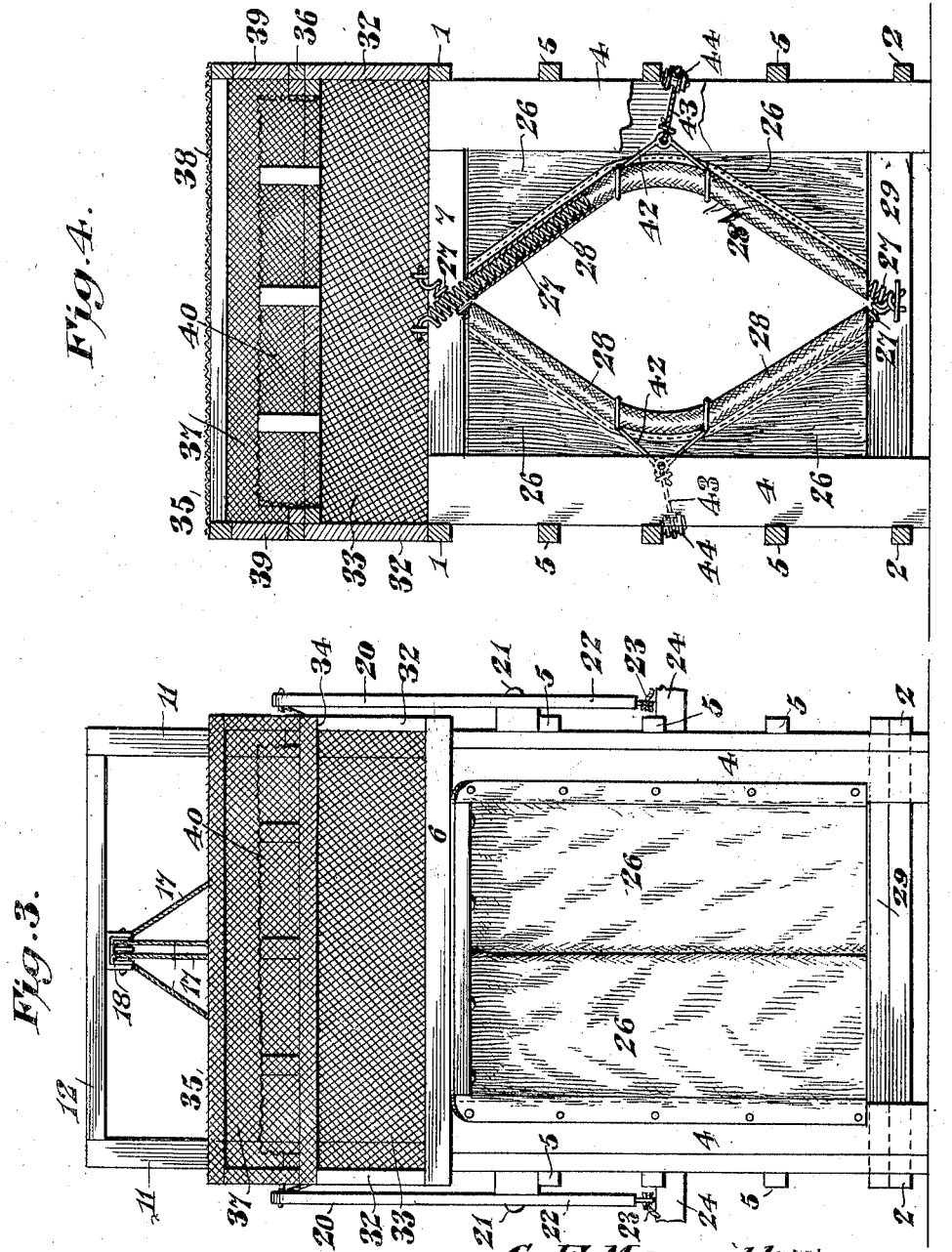

UNITED STATES PATENT OFFICE.

CHARLES F. MERRILL, OF JASPER, MISSOURI, AND EVERETT E. HALL, OF BAYARD, KANSAS.

FLY-TRAP FOR CATTLE.

1,312,130.   Specification of Letters Patent.   Patented Aug. 5, 1919.

Application filed May 6, 1918. Serial No. 232,849.

*To all whom it may concern:*

Be it known that we, CHARLES F. MERRILL and EVERETT E. HALL, citizens of the United States, residing at Jasper and Bayard, respectively, in the counties of Jasper and Allen, respectively, and States of Missouri and Kansas, respectively, have invented a new and useful Fly-Trap for Cattle, of which the following is a specification.

This invention has reference to fly traps for cattle, and its object is to provide a structure so arranged as to permit cattle or other animals to pass through it and in so doing rid themselves from flies, which latter are entrapped or retained after the cattle have passed out of the structure.

The invention includes certain features which are also included in other applications, Serial No. 232,847, and Serial No. 232,848, filed by me on even date herewith, and which features are broadly claimed in application, Serial No. 232,847, wherefore, no broad claims are made in this application but the claims are restricted to such features as are not common to this application and the application containing the broad claims.

The invention comprises a structure which may, for economical reasons, have a main frame of skeleton form and is provided with curtains normally forming obstructions to the passage of cattle but capable of being moved out of the way by the cattle in progressing through the structure. Two spaced curtains are present in the invention, one between the entrance and exit ends and movable up and down and the other at the exit end and yieldable expansibly to an animal moving out of the structure, to thereby serve as a wiper embracing the body of the animal so as to remove clinging flies therefrom and direct them into the structure where, in attempts to escape, the flies will find their way into a fly receptacle to there remain until disposed of.

The invention will be best understood from a consideration of the following detailed description taken in connection with the accompanying drawings forming part of this specification, with the understanding, however, that the invention is not confined to any strict conformity with the showing of the drawings but may be changed and modified so long as such changes and modifications mark no material departure from the salient features of the invention as expressed in the appended claims.

In the drawings:—

Fig. 2 is a longitudinal vertical section, with the parts in the position to which they are forced by an animal entering the structure.

Fig. 3 is an elevation of the structure as seen from the exit end.

Fig. 4 is a section on the line 4—4 of Fig. 2.

Fig. 5 is a section on the line 5—5 of Fig. 2.

Figure 1:
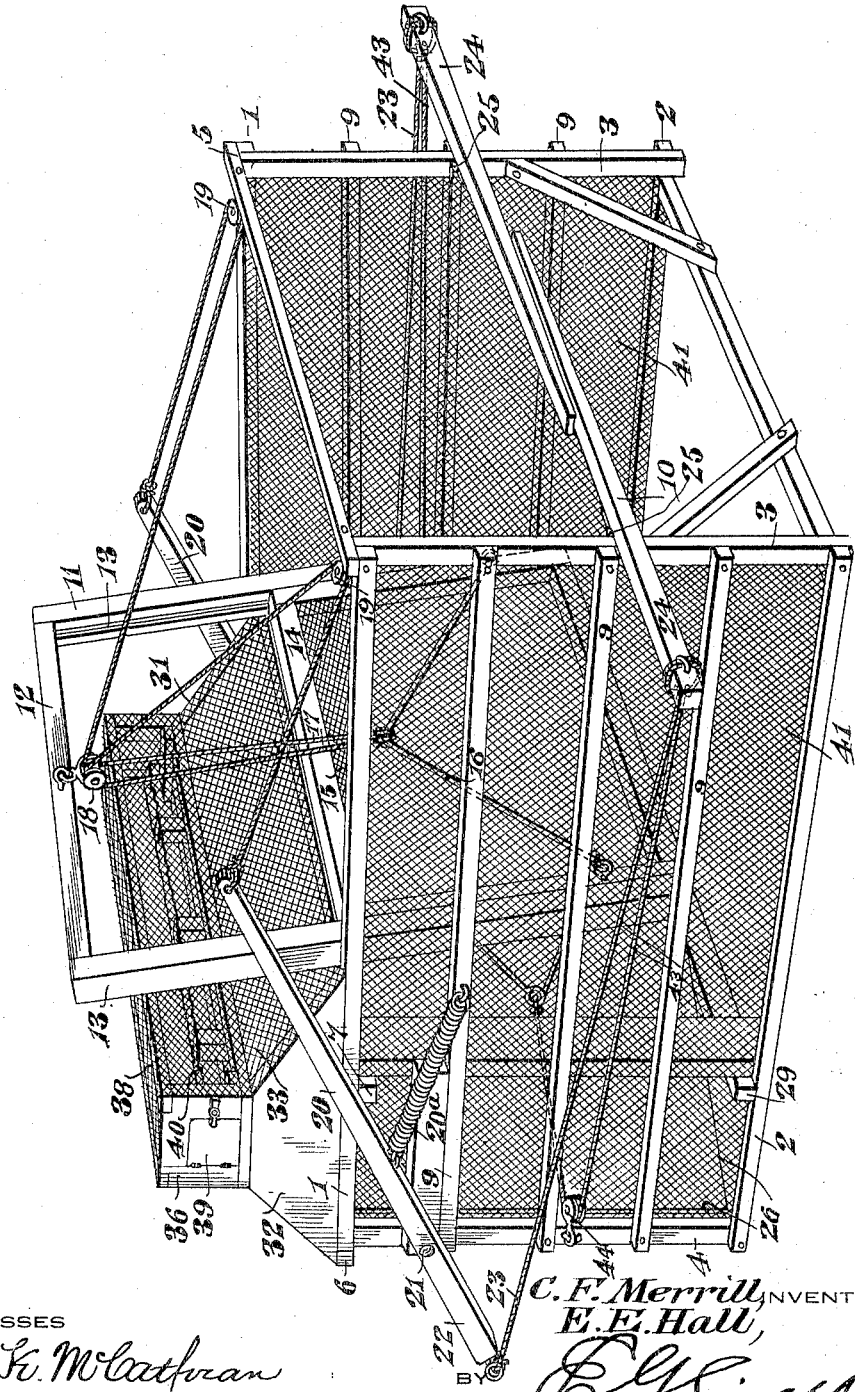
Figure 1 is a perspective view of a structure embodying the invention, with the parts in the initial position.

Referring to the drawings, there is shown a frame-work constituting the main framework of the structure and composed of top and bottom longitudinal beams 1 and 2 respectively, front and rear corner posts 3 and 4 respectively, top cross beams or bars 5, 6, 7 and 8 respectively, and longitudinal side slats 9 with such other structural parts as may be needful to impart strength and support different devices.

The end of the main frame defined by the posts 3 constitutes the entering end of the structure and hinged to each post 3 is a lever 10 directed toward the other post, the levers being long enough between the posts to overlap and at a height to be engaged by an animal traveling into the structure through the entering end, so that both levers are operated simultaneously by the animal on entering the structure.

At an intermediate point in the length of the main frame and inclosed within said main frame and projecting above the top thereof are upright guides 11 fast to the inner opposite sides of the main frame and joined together at the top by a cross strip 12. The guides 11 have grooves 13 on their inner faces in which a frame 14 is mounted to slide up and down. The guides 11 slant from their inner ends upwardly toward the rear or exit end of the main frame. The frame 14 is covered with wire screen or netting 15 and is carried by a yoke 16 to which are attached cords or strands 17 carried upwardly and through a pulley 18 attached to the cross strip 12. The strands then diverge to other pulleys 19 fast to the strip or bar 5 and then extend toward the rear or exit end of the structure where they are each attached to a respective lever 20 on the outside of the structure. The levers 20 are each secured by a pivot support 21 at a point which may be closed to the rear end of the machine and each lever has an arm 22 on the side of the pivot 21 remote from the arm of the lever to which the strand 17 is attached. The arm 22 may constitute the short arm of the lever and the short arm is connected by another strand 23 to a corresponding lever 10, the latter having a short arm 24 projecting outwardly from the main frame and at its outer end receiving the strand 23. Each lever 24 has a hinge connection 25 to the corresponding post 3.

Each lever 20 is under the normal control of a spring 20ª tending to hold the lever 10 to which the lever 20 is connected in close relation to the entering end of the main frame of the structure and to hold the lever 20 in such position that the screen frame 14, which is in effect a curtain, is lowered to its full extent, such position of the frame or curtain 14 practically obstructing the passage of animals to the exit end of the structure. When, however, an animal passes into the structure through the entering end and in so doing presses against and operates the levers 10, the levers 20 are rocked, stretching the springs 20ª and through the strands 17 raises the frame or curtain 14 high enough to give the animal a view of the exit end of the structure and permits the animal to pass under the curtain 14 to the exit of the frame.

Fast to the posts 4 at the exit end of the machine are the outer edge portions of a wall composed of two like flexible members 26 normally in contact at their meeting edges intermediate of the width of the exit opening, these contact edges containing springs or other extensible members 27 which may be housed in the meeting edges of the walls in hems 28 of the walls, which latter may be made of canvas or other suitable material. These flexible members constitute abutting wings. The springs are fast at the top to the cross beam 7 and at the bottom to a corresponding cross beam 29, the inner and outer edges of each member of the rear wall being connected to the cross beams 7 and 29 and to the posts 4 respectively. The rear wall members or curtains 26 have a top portion 30 extending from the cross beam or bar 7 to the cross beam or bar 6 so as to constitute a roof for the space above the curtains 26 and thereby preventing the escape of flies from above the curtains out through the exit end.

The curtain 14 is spaced forwardly of the curtains at the exit end of the structure and the space between the cross bars 6 and 8 is covered by a funnel shaped roof 31 having solid ends 32 and slanting wire screen sides 33. The sides 33 approach as they rise and are secured to a board or strip 34 joining the ends 32 and forming the bottom of a fly receptacle 35 which may have top of a fly receptacle 35 which may have solid ends 36 and wire screen sides 37 and top 38. One or both ends 36 may be provided with a door 39 for removing flies entrapped in the receptacle 35. Ducts 40 lead from the funnel shaped roof 31 into the receptacle 35 and may be of a character commonly used in fly traps to permit the ready entrance of flies into the receptacle but prevent the escape of flies therefrom. The side walls of the main frame are covered with wire screening 41 which is continued to the end posts 4, and the spaces between the curtains 26 and the sides of the structure open at the top into the funnel 31.

Attached to each curtain 26 at an intermediate point of the height of the meeting edges of the curtains is a connection 42 to which is attached one end of a strand 43 carried about a pulley 44 fast to the corresponding post 4 and then carried forwardly outside of the wall 41 to a corresponding lever 10. Because of the flexibility of the springs 27 and walls or curtains 26 the movement of the levers 10 under the pressure exerted thereupon by the entering animal causes a pulling apart of the meeting edges of the curtains 26 with the result that there is thereby produced an exit opening which becomes clearly visible to the approaching animal so that the latter will instinctively move to and through the exit opening.

The parts are so related that when the entering animal pushes the lever 10 before it the curtain 14 is raised out of the path of the animal and at the same time the adjoining or meeting edges of the curtains 26 are pulled apart so that the animal has free passage through the structure except that the elastic meeting edges of the curtains 26 will grasp the sides of the animal and wipe off clinging flies from the animal, the elastic or yieldable edges of the curtains 26 conforming to the varying shape of the body of the animal. Before the hind quarters of the animal pass beyond the ends of the levers 10 to permit said levers to return to their first positions, the head and shoulders of the animal have reached and may be part of the way through the exit opening where the flexible edges of the curtains 26 have been spreading apart. Now, as the animal passes through the exit opening and so releasing the curtain 14 by passing beyond the levers 10, the curtain 14 falls behind the animal and forms a wall or closure preventing the escape of flies through the entering end of the structure and the top of the structure at the entering end, said top being open. The flies, therefore, are directed by the lowered wall 14 toward the funnel roof 31 and since the flies cannot escape through the exit opening then filled by the body of the animal, the flies, which naturally rise and attempt to escape, pass through the ducts 40, of which there may be several, into the receptacle 35 and are thus imprisoned for removal at a subsequent time. As soon as the animal passes entirely through the exit opening the elastic tendency of the springs 27 causes a closure of the curtains 26, which latter may be of an opaque nature, so that on spreading the curtains apart the animal is enabled to see light ahead and naturally proceeds toward such light in traveling through the structure.

What is claimed is:—

1. In a fly trap for animals, a structure through which the animals may travel, means at the entering end of the structure responsive to the entrance of an animal, and a closure for the exit end connected to and movable by the means at the entering end for spreading the closure to produce an exit opening for the animal, said closure being constructed to wipe off flies from the animal passing through the exit.

2. In a fly trap for animals, a structure through which the animals may travel, means responsive to the entrance of the animal, and a closure at the exit end of the structure composed of parts meeting intermediate of the width of the exit end with the meeting edges elastic and normally tending to approach, and connections between the meeting edges of the parts of the closure and the means at the entrance end of the structure responsive to an entering animal, for spreading the closure parts to provide an exit opening.

3. In a fly trap for animals, a structure through which the animal may travel, a closure for the exit end of the structure composed of parts having a normal tendency to move together, and means responsive to the entrance of an animal into the structure for spreading the closure to provide an exit opening for the animal, said closure being constructed to yieldingly embrace the animal passing through the exit and wipe off flies therefrom.

4. In a fly trap for animals, a structure through which the animal may travel, a closure for the exit end of the structure composed of parts having a normal tendency to move together, and means responsive to the entrance of an animal into the structure for spreading the closure to provide an exit opening, the meeting edges of the closure parts being elastic to conform to the varying shape of the body of the animal, whereby to cling thereto and so wipe off flies from the body of the animal.

5. In a fly trap for animals, a structure through which the animals may travel, means at the entering end of the structure responsive to pressure exerted thereon by an entering animal, a normally shut two-part closure for the exit end of the structure with elastically yieldable meeting edges, and connections between said elastically yieldable meeting edges and the means at the entering end of the structure, for causing a spreading of the closure by the entrance of the animal and the clinging of the closure to the body of the animal when passing through the exit opening.

6. In a fly trap for animals, a structure through which the animals may travel, means in the path of an animal traveling through the structure for response to the travel of the animal, and a closure for the exit end of the structure comprising flexible curtains having a normal tendency to meet intermediate of the width of the exit end with the meeting edges elastically yieldable to the passage of the animal, and connections between the first named means and the elastic meeting edges for spreading the closure to produce an exit opening.

7. A fly trap for animals, comprising a structure through which the animals may travel, means at the entering end of the structure responsive to the entrance of the animal into the structure, an intermediately located curtain normally in the path of the animal, a closure for the exit end comprising two flexible members normally meeting intermediate of the width of the exit end and provided with elastically yieldable meeting edges, and connections between the responsive means at the entering end of the structure and the intermediate curtain and also the meeting edges of the exit closure for raising the curtain and simultaneously spreading the parts of the closure for the exit end.

8. A fly trap for animals, comprising a structure through which the animals may travel, means at the entering end of the structure responsive to the entrance of the animal into the structure, an intermediately located curtain normally in the path of the animal, a closure for the exit end comprising two flexible members normally meeting intermediate of the width of the exit end and provided with elastically yieldable meeting edges, connections between the responsive means at the entering end of the structure and the intermediate curtain and also the meeting edges of the exit closure for raising the curtain and simultaneously spreading the parts of the closure for the exit end, said structure also being provided with side and top walls impervious to flies at that part of the structure between the curtain and closure for the exit end, and a fly receptacle at a high point communicating with the space between the curtain and the closure for the exit end.

9. A fly trap for animals, comprising a structure through which the animals may travel, pressure-responsive means in the path of the animal at the entering end of the structure, a closure for the exit end composed of flexible curtains normally meeting at an intermediate point of the width of the exit end and having the meeting edges elastic, another curtain of relatively rigid form and provided with guiding means for up and down movements of the curtain, said curtain being located between the entering and exit ends of the main structure, a fly receptacle above and communicating with the space between the intermediate curtain and exit end of the structure, and connections between the pressure-responsive means at the entering end of the structure and both the curtain and the closure, whereby on the entrance of an animal the intermediate curtain is raised and the closure is spread apart to produce an exit opening.

10. A fly trap for animals, comprising a structure through which the animals may travel, pressure-responsive means in the path of the animal at the entering end of the structure, a closure for the exit end composed of flexible curtains normally meeting at an intermediate point of the width of the exit end and having the meeting edges elastic, another curtain of relatively rigid form and provided with guiding means for up and down movements of the curtain, said curtain being located between the entering and exit ends of the main structure, a fly receptacle above and communicating with the space between the intermediate curtain and exit end of the structure, and connections between the pressure responsive means at the entering end of the structure and both the curtain and the closure, whereby on the entrance of an animal the intermediate curtain is raised and the closure is spread apart to produce an exit opening, the connections between the pressure-responsive means and the intermediate curtain including motion-multiplying levers and springs against the tendency of which the levers are moved to raise the intermediate curtain.

11. In a device of the character described, a passageway for animals, two abutting wings in said passageway to remove flies from animals passing therethrough, and resilient means to normally hold said wings in closed position and conforming, approximately, to the contour of each animal's body as it passes between said wings.

In testimony, that we claim the foregoing as our own, we have hereto affixed our signatures.

CHARLES F. MERRILL.
EVERETT E. HALL.

Witnesses:
E. D. CRAWFORD,
ARTHUR L. TEETER.